Jan. 2, 1968  R. J. BEESON  3,361,043
PAVEMENT REINFORCEMENT MESH PLACER
Filed Feb. 24, 1966  7 Sheets-Sheet 1
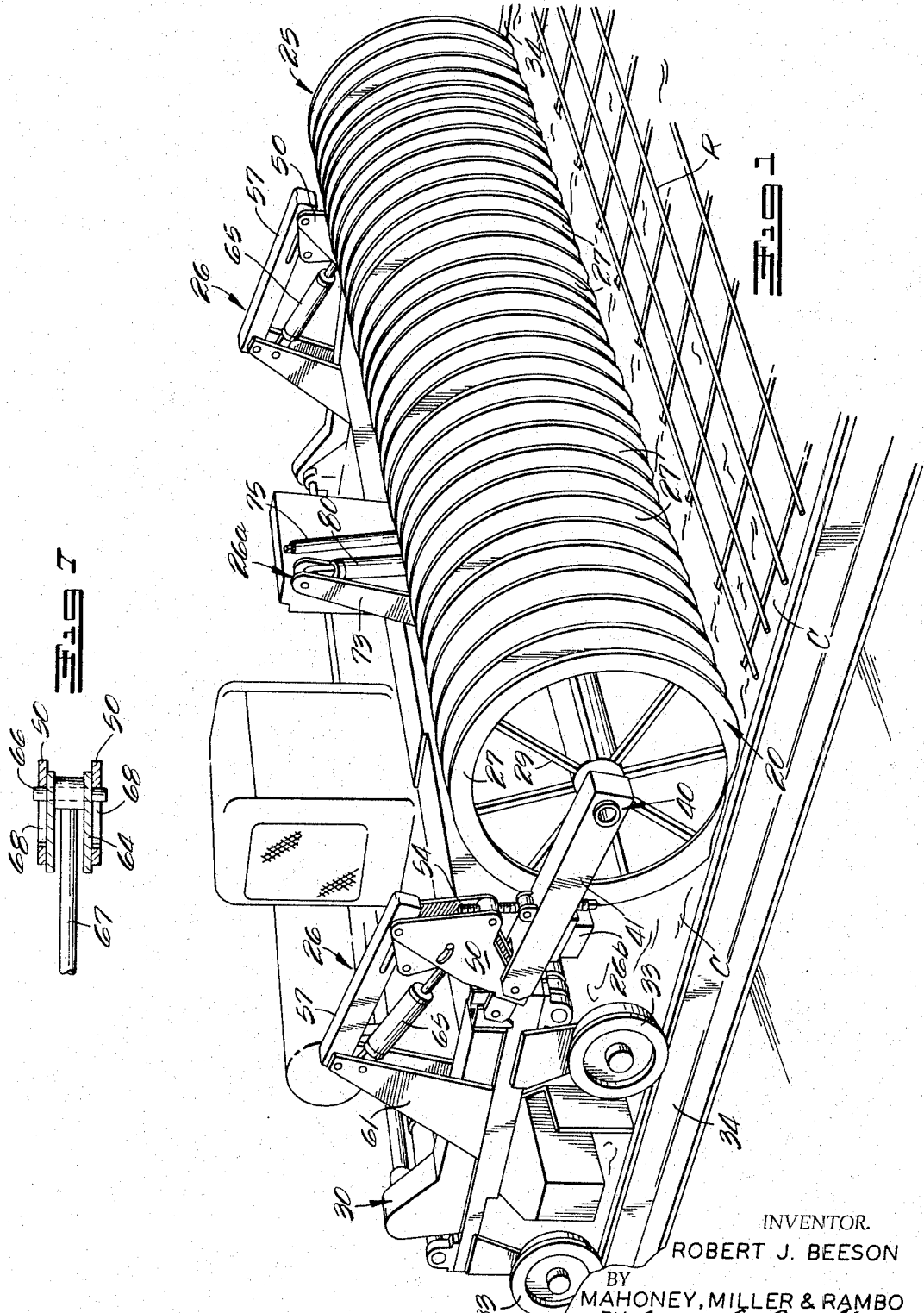
INVENTOR.
ROBERT J. BEESON
BY MAHONEY, MILLER & RAMBO
BY
ATTORNEYS

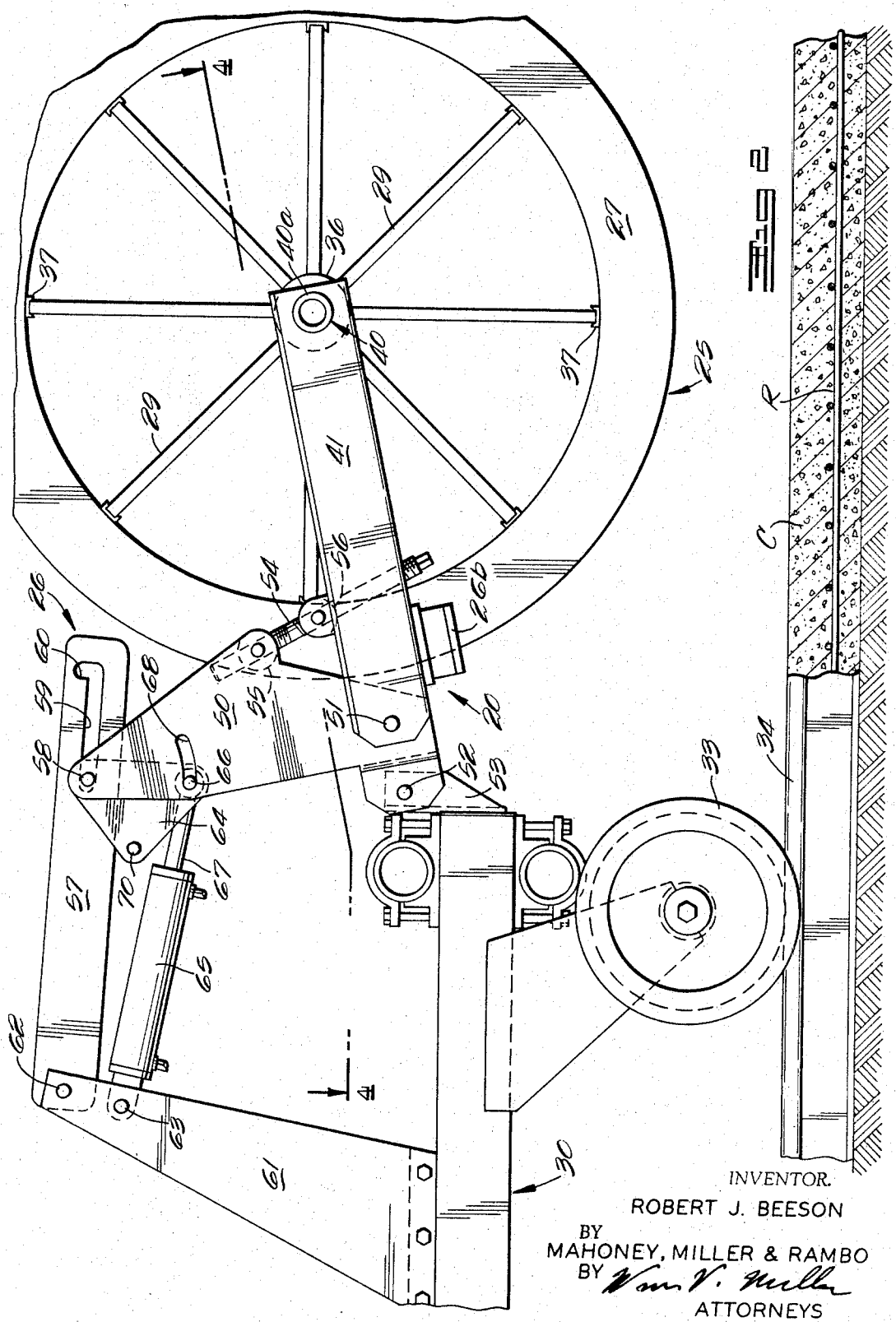

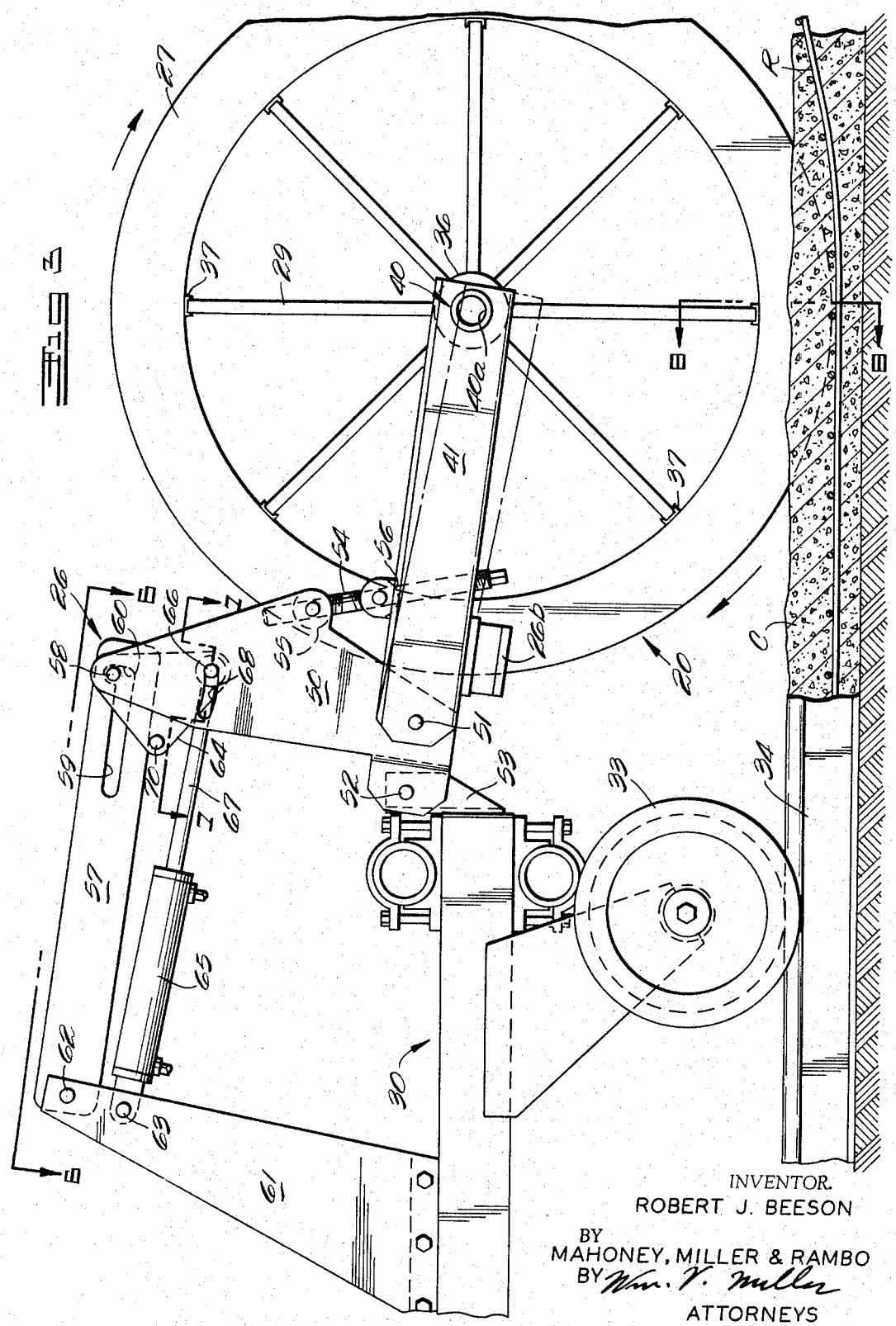

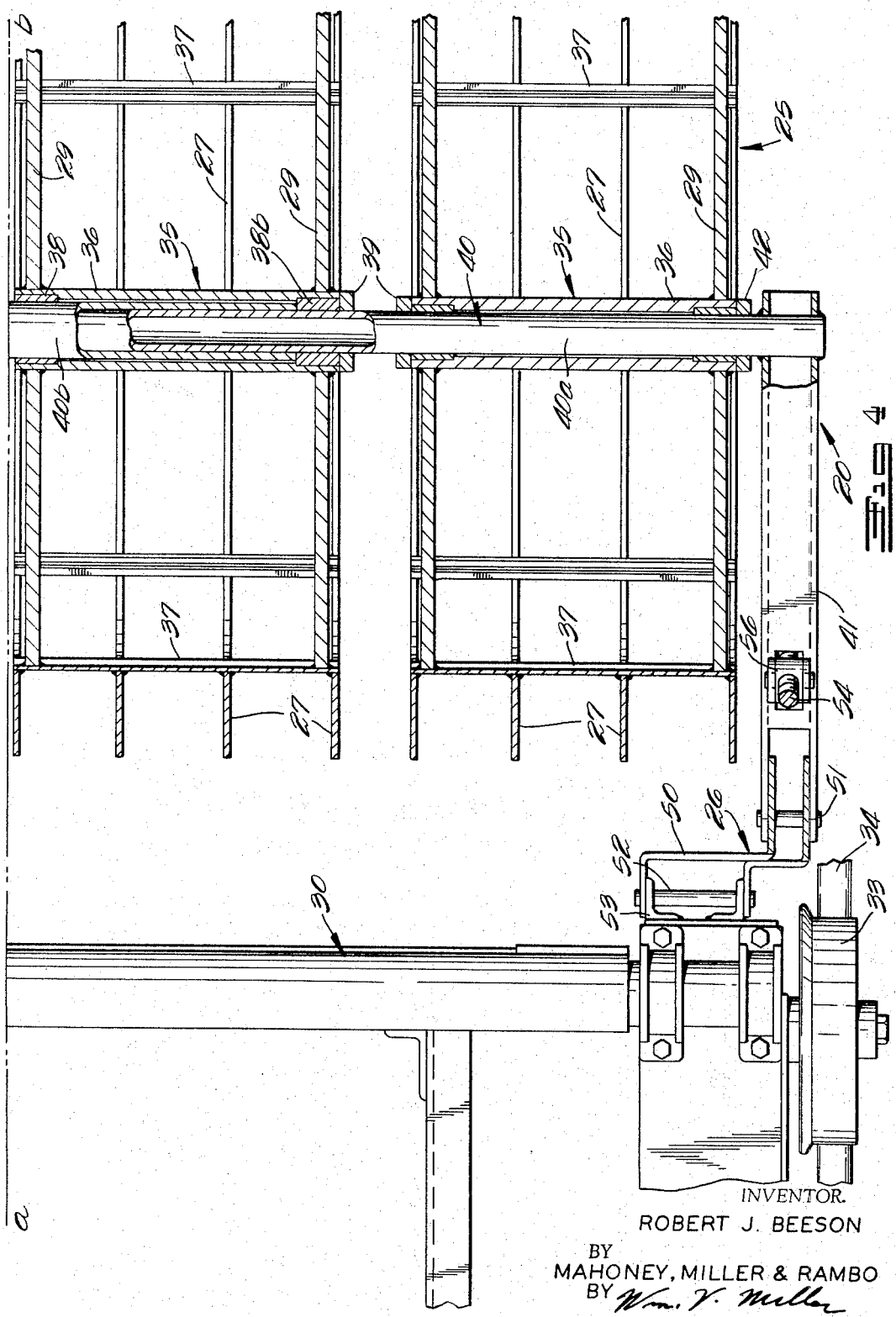

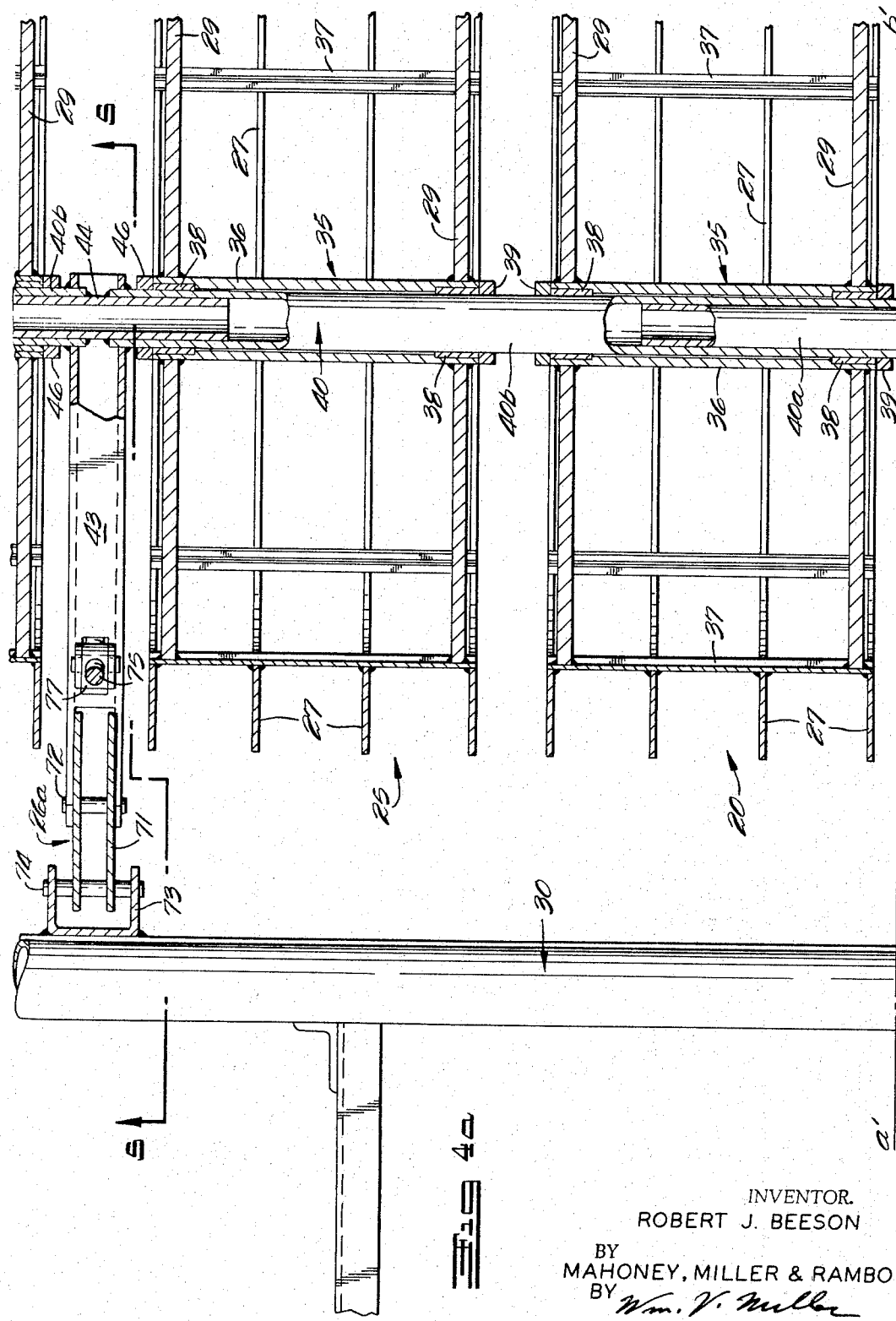

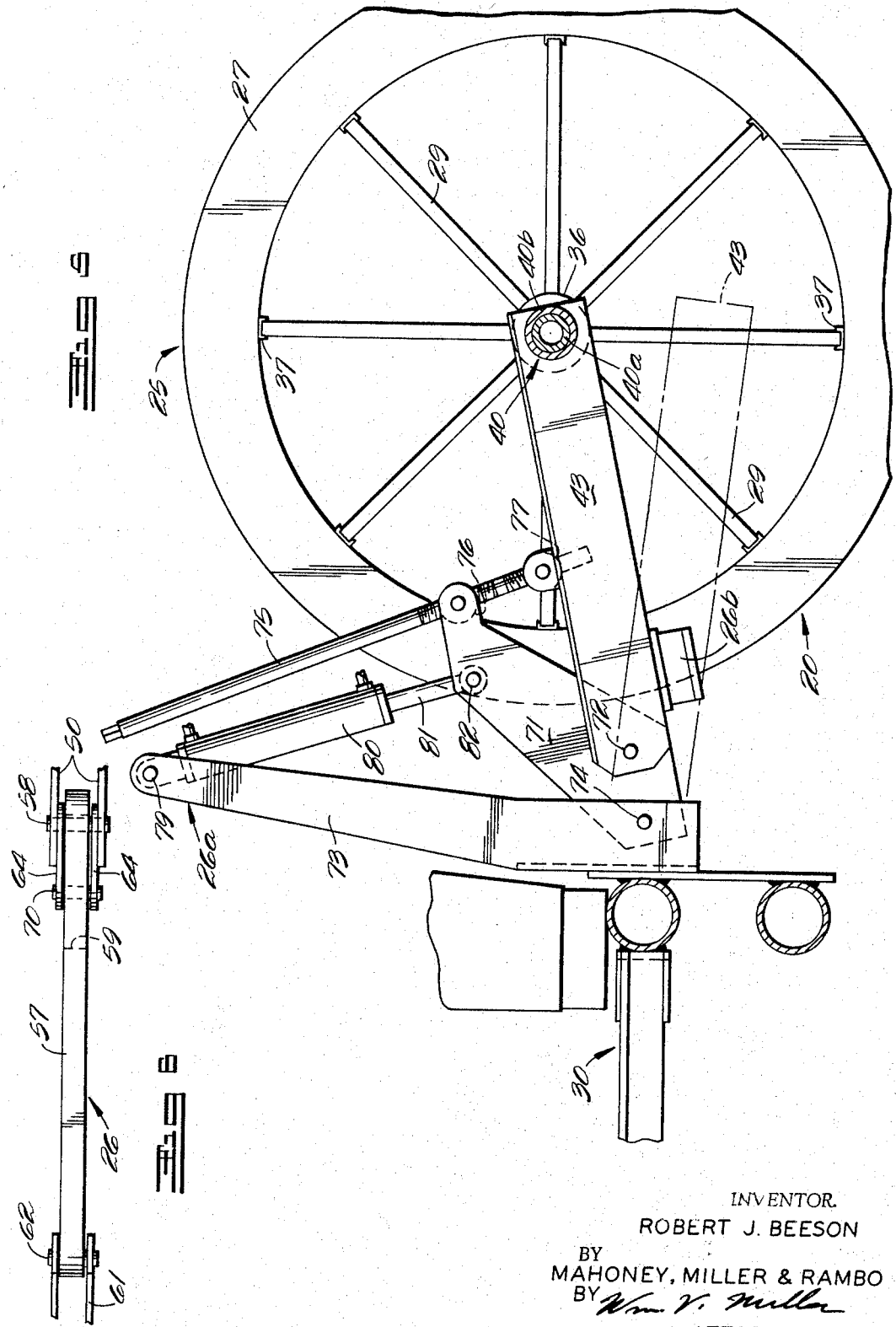

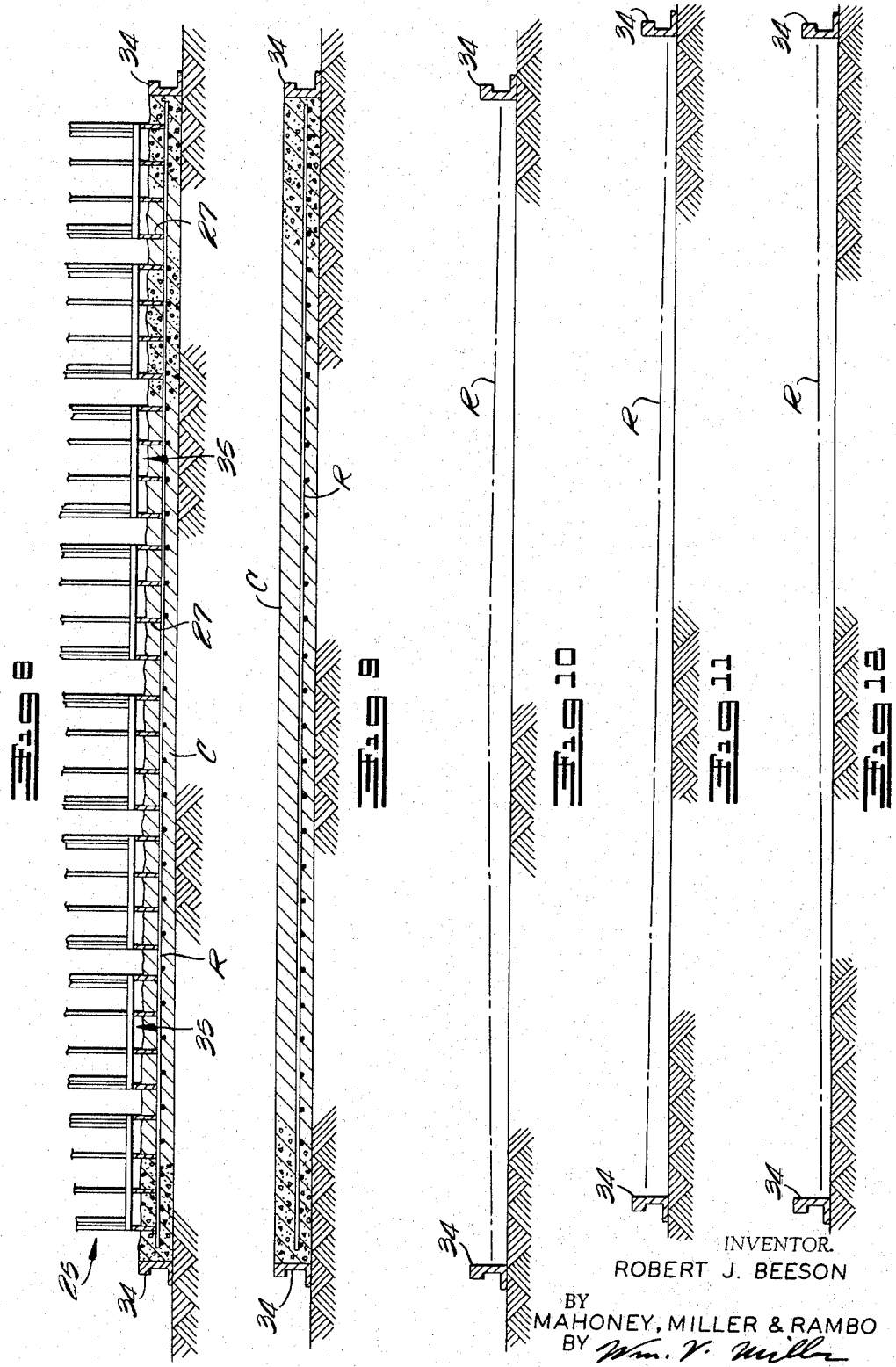

United States Patent Office 3,361,043
Patented Jan. 2, 1968

3,361,043
PAVEMENT REINFORCEMENT MESH PLACER
Robert J. Beeson, Worthington, Ohio, assignor to The Jaeger Machine Company, Columbus, Ohio, a corporation of Ohio
Filed Feb. 24, 1966, Ser. No. 529,720
6 Claims. (Cl. 94—39)

ABSTRACT OF THE DISCLOSURE

My invention has to do, particularly, with apparatus which is preferably in the form of an attachment for a machine movable along side forms, for locating a reinforcing mesh at a predetermined level in the plastic material, previously spread between the forms, just prior to the finishing of the surface of that material. The invention is particularly applicable to the positioning of a flat mesh of reinforcing steel rod at a predetermined level below the surface of a previously spread layer of concrete before the concrete sets and while it is still sufficiently plastic to permit the forcing of the mesh to a predetermined submerged depth therein.

---

At the present time, it is most common to spread one layer of concrete, lay the reinforcing mesh on the surface of that layer, and then cover the mesh with a second layer of the concrete which is spread over the mesh. This two-pass method obviously is undesirable because of the time and labor required. Attempts have recently been made to provide machines which will place the mesh in the spread concrete at a predetermined depth without resorting to the two passes to lay the two layers of material. One type of prior art machine has been a vibratory grid type which engages and forces the grid into the concrete and which must be of heavy and expensive construction, is slow in operation and overvibrates the material. Also, this machine must be designed as a complete machine for performing the one operation of placing the mesh. Another prior art machine mesh placer has been designed as an attachment for a finishing machine and has included ski-like depressors for engaging the mesh and forcing it to a preselected depth in the concrete, but these ski depressors tend to snag with the mesh.

It is the main object of my invention to provide an efficient low-cost mesh placer which is designed as an attachment for a machine movable along a previously spread layer of concrete or similar plastic material, which will be provided with mesh-placing means that will not snag with the mesh and will accurately place the mesh at a predetermined level below the surface of the concrete, and which will not detract from the speed of the following finisher means.

In the accompanying drawings, I have illustrated the preferred form which the apparatus of this invention may take but it is to be understood that specific details thereof may be varied without departing from basic principles of my invention.

In these drawings:

FIGURE 1 is a perspective view of the mesh placing attachment showing it mounted on the front of a machine supported by and movable along side forms between which the concrete has been spread.

FIGURE 2 is an enlarged side elevational or end view of the attachment showing the mesh-placing roller in a raised, inoperative position.

FIGURE 3 is a view similar to FIGURE 2 but showing the mesh-placing roller in a lowered, operative position.

FIGURE 4 is a sectional view taken from the substantially horizontal position indicated at line 4—4 in FIGURE 2 but showing only a portion of the attachment at one end of the roller.

FIGURE 4a is a view similar to FIGURE 4 but showing an intermediate portion of the attachment, FIGURE 4a matching at the line a'–b' with FIGURE 4 at the line a–b.

FIGURE 5 is a vertical sectional view taken at line 5—5 of FIGURE 4a.

FIGURE 6 is a detail in plan taken substantially from the position indicated at line 6—6 of FIGURE 3.

FIGURE 7 is a substantially horizontal sectional view taken along line 7—7 of FIGURE 3.

FIGURE 8 is a vertical sectional view taken along line 8—8 of FIGURE 3 showing the use of the attachment in placing the mesh.

FIGURE 9 is a schematic view showing the mesh in position at the proper depth in the layer of material.

FIGURES 10 to 12 are schematic views showing the mesh in various crown positions as placed by my attachment.

With particular reference to the drawings, in FIGURE 1 I have illustrated my invention in the form of a mesh placer attachment indicated generally by the numeral 20. This attachment is shown mounted at the front of a mobile form-supported vehicular unit, indicated generally by the numeral 30, and which may, for example, be the same as the unit illustrated in the patent to Apel et al., No. 3,015,259 issued Jan. 2, 1962 with the spreader screw assembly removed. This unit may be a self-propelled unit which is supported by wheels 33 which operate on the side forms 34 that serve as forms for the layer of concrete C previously spread therebetween by suitable spreader means which may also be in the form of an attachment for the front end of the unit 30 as disclosed in said patent. The unit 30 may be the pavement finishing machine or may be followed by a finisher.

The mesh placer 20 of this invention includes a mesh-placing roller 25 which is supported from the unit 30 and is adjustable as to axial extent so as to extend transversely the full distance between the side forms 34 but is free to move vertically downwardly between the side forms. The roller 25 is supported for vertical movement by means of a pair of identical arm structures 26 located at its opposed axial ends and a different arm structure 26a located midway of said ends. These arm structures include vertically swingable means to move the roller between a raised, inoperative position and a lowered, operative position where it is forced downwardly into the spread concrete to a predetermined limited extent. The supporting arm and roller arrangement further is so constructed that provision may be made for crown adjustment of the roller in accordance with variations in transverse crown or contour to be imparted to the finished pavement surface by the unit 30.

The particular structure of the roller 25 is illustrated best in FIGURES 1 to 5 and it will be noted that it consists mainly of a plurality of axially spaced mesh-engaging rings 27. Each ring is in the form of a continuous band of metal disposed on edge and the band is of a depth preferably greater than the depth it is desired to force the reinforcing mesh into the plastic concrete C. The rings 27 are preferably arranged in groups of axially spaced rings secured together at their centers to provide sections 35 which are of uniform axial extent so that any desired number of sections can be incorporated in the roller depending on the width of the pavement being formed, that is, the distance between the forms 34.

Each ring is carried on the outer ends of the radial spokes 29 which have their inner ends rigidly secured to a hub in the form of a sleeve 36 which is of selected length. In the example shown (FIGURES 4 and 4a) four of the rings 27 are arranged in each group to provide the sections 35 of uniform axial extent. In each section, the rings are axially spaced uniformly. Bars 37 may be welded to the inner edges of the rings 27 at circumferentially spaced positions to aid in maintaining them in axially spaced relationship. The sleeves 36 are rotatably mounted on a transversely extending shaft 40 and bearing bushings 38 may be provided on the ends of the sleeves to reduce wear. At the ends of the sleeves 36 of adjacent sections 35, set collars 39 may be provided on the shaft 40 for axially spacing the sections 35.

The shaft 40 is of telescopic construction so that its length can be varied in accordance with the number of roller sections 35 it is necessary to support. It is composed of two telescopic sections which are provided on opposite sides of the intermediate support arm 26a. Each telescopic section comprises a smaller diameter tube or pipe 40a slidably fitting within a larger tube or pipe 40b. The outer end of the pipe 40a extends into and is welded in an opening (FIGURE 4) in the forward end of the roller support arm 41 of the arm structure 26 and spaced axially inwardly of its extremity and is provided with a set collar 42 for engaging the outer end of the tube 36 of the adjacent roller section 35. The inner larger pipe section 40b (FIGURE 4a) is mounted on the roller support arm 43 of the middle arm structure 26a. It will be apparent that certain sleeves 36 are of a size to fit on the smaller pipe sections 40a and others are of a size to fit on the larger pipe sections 40b. A heavier bearing bushing 38b is provided at the outer end of the pipe section 40b. The inner end of each pipe section 40b is welded in an opening in the forward end of the arm 43 (FIGURE 4a) and the pipe section carries a stop collar 46 which engages the adjacent inner end of the sleeve 36 of an associated roller section 35. For reinforcement, a short tube section 44 is provided which extends in opposite directions into the opposed ends of the pipe sections 40b at opposite sides of the arm 43. The section 44 may be welded to one or both of the sections 40b to hold it in a fixed axial position relative thereto.

The roller-supporting arm structures 26 are indicated best in FIGURES 1 to 7. Each structure 26 includes the forward roller supporting arm 41, previously mentioned, which receives the outer end of the pipe 40a. The rear end of this arm 41 is pivoted for vertical adjustment about a horizontal pivot 51 carried transversely at the lower end of an upstanding double plate support bracket 50 and it will be noted that the rear end of the arm 41 is bifurcated and straddles the bracket 50. This bracket 50 is pivoted by a horizontal, transversely disposed pivot 52 to lugs 53 carried on the forward side of the frame of the unit 30. The plate 50 and the arm 41 in effect form a bell crank lever and the angle of this lever is adjustable by relative movement of these members about the pivot 51. This adjustment is accomplished by means of an adjusting screw 54 which has oppositely threaded sections that fit into the nuts 55 and 56 pivotally carried by the respective members 50 and 41. The bifurcated upper end of the bracket 50 receives the outer end of a latch link 57 and is provided with a transverse pin 58 which cooperates with a slot 59 that extends longitudinally of the link 57. The outer or forward end of the slot 59 is provided with an upwardly offset keeper end 60. The rear end of the link 57 extends between the plates of a double plate support bracket 61, which is rigidly carried by the frame of the unit 30 in an upstanding position at a point spaced from the front end thereof, and is pivoted thereto for vertical swinging movement about a transverse horizontal pivot 62 carried thereby. To raise and lower the forward end of the arm 41, a double-acting hydraulic ram 65 is provided which is pivoted at its rear end at 63 to the bracket 61 directly below the pivot 62. The rod 67 of the ram extends forwardly between the plates of the bracket 50 and between a rocker bracket 64 formed by a pair of laterally spaced plates located between the sides of the link 57 (FIGURE 6) and the respective plates of the bracket 50. The plates of the bracket 64 are substantially triangular and at a lower angle they carry a transverse pin 66 on which the end of the piston rod 67 rocks and which projects outwardly in both directions into aligning arcuate slots 68 formed in the plates of the bracket 50. The plates of the bracket 64 have aligned openings at the upper angle of the bracket through which the transverse latch pin 58 extends. At the remaining angle the bracket 64 carries between its plates a latch link lifting pin 70 which is below the link 57.

Assuming the ram 65 to be in its retracted position shown in FIGURE 2, the roller supporting arm 41 will be swung upwardly into roller lifting position. This will be due to the fact that the piston rod 67 will be pulled rearwardly to a position where the pin 66 engages the rear ends of the slots 68 to swing the bracket 50 rearwardly about the pivot 52 causing the rigidly connected arm 41 to swing upwardly therewith. The bracket 64 will first rock rearwardly about the pin 58 but when the pin 66 contacts with the rear ends of the slots 68, the bracket 64 and the bracket 50 will move rearwardly together. At this time, the pin 58 will be in the rear portion of the slot 59 and the lift pin 70 will be spaced below the link 57. If the ram 65 is now extended, the rod 67 first moves the pin 66 forwardly in the slots 68 until it strikes the forward ends of the slots, the bracket 64 rocking forwardly about the pin 58 to lower the pin 70. After contacting the forward ends of the slots 68, the pin 66 pushes the arm 50 forwardly, the bracket 64 moving therewith, and lowers the arm 41. This causes the pin 58 to move into the forward end of the slot 59 of the link 57 at which time the keeper end 60 will drop over the latch pin 58 and latch the bracket 50 in a forward position and, consequently, the arm 41 in a downward position. Upon retraction of the ram, the rocker bracket 64 first swings rearwardly about the pin 58 as the pin 66 passes into the rear of the slots 68 and this moves the lift pin 70 upwardly to lift the latch link 57 upwardly and release the pin 58 from the keeper end 60 of the slot. The rod 67 will continue to move rearwardly and when the pin 66 engages the rear ends of the slots 68, the bracket 50 will be swung rearwardly and the arm 41 upwardly about the pivot 52, the pin 58 moving rearwardly in the slot 59. Thus, upon extension of the ram 65, the arm 41 is swung downwardly and latched in the downward position shown in FIGURE 3, whereas upon retraction of the ram, the latch is first released and then the arm 41 is swung upwardly into the position shown in FIGURE 2. The screw 54 is used in adjusting the roller 25 for a particular crown or transverse contour of pavement, as will be readily apparent later.

The intermediate or central roller-supporting arm structure 26a is indicated best in FIGURES 1, 4a and 5. This structure includes the forward roller-supporting arm 43, previously mentioned, which receives the inner end of the pipe 40b. The bifurcated rear end of the arm 43 straddles a double-plate bracket 71 and is hinged thereto for relative vertical adjustment by means of the transverse horizontal pivot pin 72. The bracket 71 is pivoted at its lower rear corner between a vertical standard or support 73, of channel cross section, which is secured to the front of the unit 30 in upstanding position, by means of a transverse horizontal pivot pin 74. For relative adjustment of the angle of the bell crank lever formed by the members 71 and 43, an adjusting screw 75 is provided in the angle between these members. This screw 75 has oppositely threaded sections extending into the nuts 76 and 77 pivotally carried by the respective members 71 and 43. For swinging the bell crank about the pivot 74 to adjust the roller support arm between raised inoperative position and lowered operative position, a double-acting, hydraulic ram 80 is provided which may be actuated in synchronism with the two end rams 65 by suitable control means (not shown). The ram 80 is pivoted at its upper end by a transverse horizontal pivot pin 79 to the upper end of the standard 73. The lower end of the piston rod 81 of the ram extends into the space between the plates of the bracket 71 and is pivoted thereto by a horizontal transversely extending pivot pin 82. When the ram 80 is retracted, the roller-supporting arm 43 will be in raised, inoperative position as shown in FIGURE 5 whereas when the ram is extended, the arm 43 will be swung downwardly into lowered, operative position (FIGURE 1). The screw 75 is used in adjusting the roller 25 for a particular crown or transverse contour of pavement, as will be readily apparent later.

In the use of this machine, the concrete will first be spread between the side forms 34 to the level of the upper edges of the forms and then the finishing unit 30 will pass thereover and will push the mesh placing attachment 20 ahead of the final finishing screed on the unit 30. The flat mats of reinforcement R will previously be laid in place on the surface of the plastic concrete C between the forms. The roller 25 will engage the mat and will force it into the plastic concrete to the desired level. This level will be determined by adjustment of the screws 75 and 54. The rams 65 and 80 will be in extended condition so as to hold the arms 41 and 43 in their lowermost positions. These positions will be determined by the pins 58 latching into the keepers 60 of the latch rings 57. It will be sufficient to lock the end arms 41 in their lowermost positions and it is not necessary to lock the central arm 43 in its lowermost position. In starting the mesh placing operation, the rams 65 and 80 will be in retracted position and the roller 25 will be above the first mat over which the machine passes. Before the machine moves along the mat, the rams may be extended to push the roller down in the concrete and submerge the adjacent rear end of the first mat. Then the roller 25 will be locked at this level and will continue to push the mats to this level as it subsequently passes over them. The rings 27 will be of sufficient depth that they will not be completely submerged in the concrete but will roll into the concrete with their inner edges exposed. By adjusting the screws 54 and 75, the axes of the two telescopic sections of the shaft 40, on opposite sides of the support arm 43, can be selectively inclined independently. This adjustment can be used in placing the mesh at various transverse angles in the spread material to compensate for different crowns finished by the unit 30. Thus, as indicated in FIGURES 8 and 9, with the axes of both shaft sections aligned, the mesh would be forced into a flat plane position below the surface of the concrete. However, the various conditions illustrated in FIGURES 10, 11 and 12 may be obtained by proper relative adjustment of the telescoping shaft sections.

The number of sections 35 on the shaft 40 may be varied in accordance with the width of the pavement being produced. These sections may be readily removed or replaced as desired by slipping the telescoping shaft sections 40a and 40b apart and then positioning the additional sections 35 thereon or removing sections.

It is desirable to provide means for vibrating the roller 25. This is desirable so as to make it possible to vibrate the roller as it is forcing the mesh into the concrete and, therefore, make the roller more effective in the mesh-placing operation. Furthermore, the vibration will also serve to shake the concrete off the rings 27 as they roll out of the concrete. For this purpose, any suitable type of vibrating means may be provided on the roller 25 but it preferably takes the form of electromagnetic units 26b which may be mounted on the arms 41 and 43 of the respective arm structures 26 and 26a.

It will be apparent that this invention provides an attachment which comprises mainly a mesh placing roller made up of rings which will roll into the previously spread plastic concrete or other similar material and force the mesh to a predetermined submerged level therein. The roller is readily adjustable between operative and inoperative positions and is further readily adjustable for different transverse contours of the pavement. Also, it is readily adjustable for different widths of pavement.

Having thus described this invention, what is claimed is:

1. Apparatus for submerging reinforcement mesh in previously spread plastic material comprising a roller for rolling over the mesh which is laid on the surface of the material and for pressing it downwardly in the material to a selected level, means for supporting said roller for movement over the mesh, and means for holding said roller at a predetermined level on said supporting means; said holding means including locking means for locking the roller at the predetermined level and means for releasing said locking means, said holding means being adjustable to move the roller between a lowered locked operative position and a raised inoperative position, in which said holding means comprising bell cranks for supporting the roller for vertical adjustment, and rams for operating said bell cranks.

2. Apparatus according to claim 1 in which said roller has a shaft with opposed outer ends and an intermediate portion supported by said bell cranks.

3. Apparatus according to claim 2 in which said shaft is a telescoping shaft and said roller is composed of separate axially disposed sections on said shaft.

4. Apparatus according to claim 2 in which each bell crank is formed of angularly disposed arms hinged together, and means between the arms for adjusting the angular relationship thereof.

5. Apparatus according to claim 4 in which said holding means includes latching means cooperating with at least one of said bell cranks to automatically latch it in position upon movement of it to lower the roller into operative position, and said latching means comprising a pivoted latch link carried by said supporting means and releasably engaging the bell crank.

6. Apparatus according to claim 5 including a latch-releasing means pivoted to said bell crank and automatically engageable with said latch link to release it upon movement of said bell crank to raise the roller to inoperative position.

References Cited

UNITED STATES PATENTS

| | | | |
|---|---|---|---|
| 1,546,107 | 7/1925 | Robb | 94—39 |
| 1,764,963 | 6/1930 | Laster | 94—50 |
| 2,077,356 | 4/1937 | Day | 94—39 |
| 2,127,485 | 8/1938 | Owens | 94—50 |
| 3,038,397 | 6/1962 | Middlestadt | 94—39 |
| 3,319,544 | 5/1967 | Heltzel | 94—39 |

JACOB L. NACKENOFF, *Primary Examiner.*